(12) United States Patent
Chang

(10) Patent No.: US 12,201,087 B2
(45) Date of Patent: Jan. 21, 2025

(54) HARNESS FOR ANIMALS

(71) Applicant: Hae In Chang, Seoul (KR)

(72) Inventor: Hae In Chang, Seoul (KR)

( * ) Notice: Subject to any disclaimer, the term of this patent is extended or adjusted under 35 U.S.C. 154(b) by 0 days.

(21) Appl. No.: 17/985,157

(22) Filed: Nov. 11, 2022

(65) Prior Publication Data

US 2024/0099269 A1    Mar. 28, 2024

(30) Foreign Application Priority Data

Sep. 22, 2022    (KR) .................. 10-2022-0120212

(51) Int. Cl.
*A01K 27/00*    (2006.01)

(52) U.S. Cl.
CPC ................. *A01K 27/002* (2013.01)

(58) Field of Classification Search
CPC .............. A01K 27/00; A01K 27/002
See application file for complete search history.

(56) References Cited

U.S. PATENT DOCUMENTS

| | | | | |
|---|---|---|---|---|
| 11,666,035 B2* | 6/2023 | Stevens | ............... | A01K 27/002 119/792 |
| 11,832,591 B1* | 12/2023 | Xu | ...................... | A01K 27/006 |
| 2012/0024239 A1* | 2/2012 | Forbes | ................ | A01K 27/002 119/863 |
| 2019/0124890 A1* | 5/2019 | Kath | ..................... | A01K 1/0263 |
| 2019/0364850 A1* | 12/2019 | Kruse | .................. | A01K 27/005 |
| 2019/0373860 A1* | 12/2019 | Kath | ..................... | A01K 13/006 |
| 2020/0100468 A1* | 4/2020 | Elam | ..................... | A01K 27/002 |
| 2020/0100469 A1* | 4/2020 | Elam | ..................... | A01K 27/004 |
| 2020/0205372 A1* | 7/2020 | Anderson | ............. | A01K 1/029 |
| 2022/0142124 A1* | 5/2022 | Stevens | ............... | A01K 27/002 |
| 2022/0167591 A1* | 6/2022 | Sullivan, II | ......... | A01K 27/002 |

(Continued)

FOREIGN PATENT DOCUMENTS

| | | |
|---|---|---|
| CN | 209403287 | 9/2019 |
| CN | 215123219 U | * 12/2021 |

(Continued)

OTHER PUBLICATIONS

Office Action dated Dec. 6, 2022 for Korean Patent Application No. 10-2022-0120212 and its English translation by Google Translate.

(Continued)

*Primary Examiner* — Monica L Perry
*Assistant Examiner* — Aaron M Rodziwicz
(74) *Attorney, Agent, or Firm* — WOMBLE BOND DICKINSON (US) LLP

(57) ABSTRACT

Disclosed is a harness for animals, the harness including a chest rest configured to wrap a chest or the chest and a part of an abdomen of an animal, wherein the chest rest includes a main body portion including a front area and a rear area each having a relatively large width and a middle area extending from the front area to the rear area, the middle area being long and narrow, and a plurality of bands coupled to the main body portion, each of the bands being provided at one end thereof with a first fastening member configured to perform fastening when the harness is worn, and a three-dimensional pattern is formed in left-right symmetry at an inner surface of the chest rest that abuts a body of the animal when the chest rest is worn.

11 Claims, 13 Drawing Sheets

(56) References Cited

U.S. PATENT DOCUMENTS

| | | | |
|---|---|---|---|
| 2022/0201982 A1* | 6/2022 | Elam | A01K 27/004 |
| 2023/0069978 A1* | 3/2023 | Salyer | A01K 27/008 |
| 2023/0172164 A1* | 6/2023 | Guo | A01K 27/002 |
| | | | 119/792 |
| 2023/0217900 A1* | 7/2023 | Kendall | A01K 1/0263 |
| | | | 119/856 |
| 2023/0240267 A1* | 8/2023 | Guidetti | A01K 27/002 |
| | | | 119/863 |
| 2023/0263138 A1* | 8/2023 | Stevens | A01K 27/002 |
| | | | 119/792 |

FOREIGN PATENT DOCUMENTS

| | | | |
|---|---|---|---|
| CN | 217184346 | | 8/2022 |
| CN | 217184346 U | * | 8/2022 |
| JP | 2007-159440 | | 6/2007 |
| JP | 2009-159917 | | 7/2009 |
| JP | 2011-239735 | | 12/2011 |
| JP | 2021-87385 | | 6/2021 |
| KR | 20-2022-0000099 | | 1/2022 |
| KR | 10-2395761 | | 5/2022 |

OTHER PUBLICATIONS

Office Action dated Dec. 12, 2023 for Japanese Patent Application 2022-181667 and its English machine translation by Google Translate.

* cited by examiner

[Fig. 1]
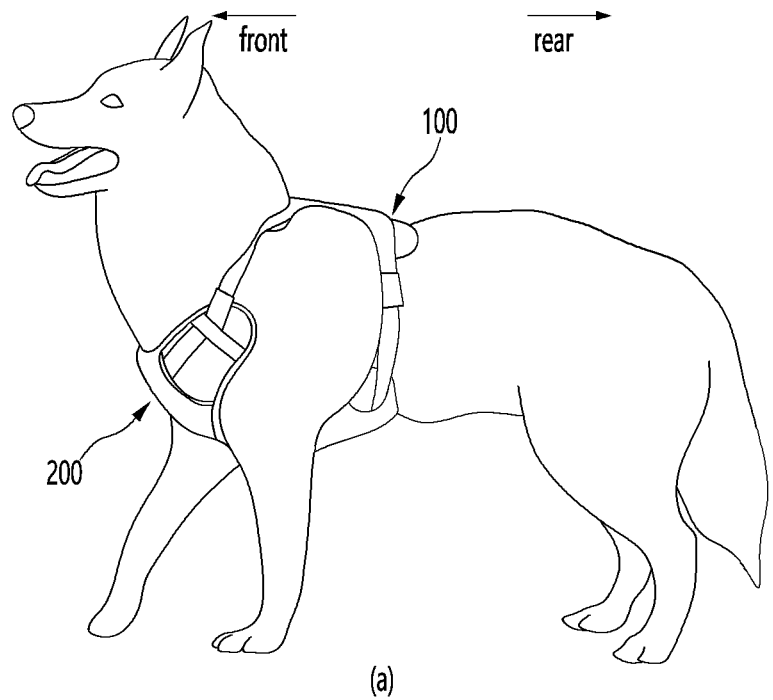
(a)
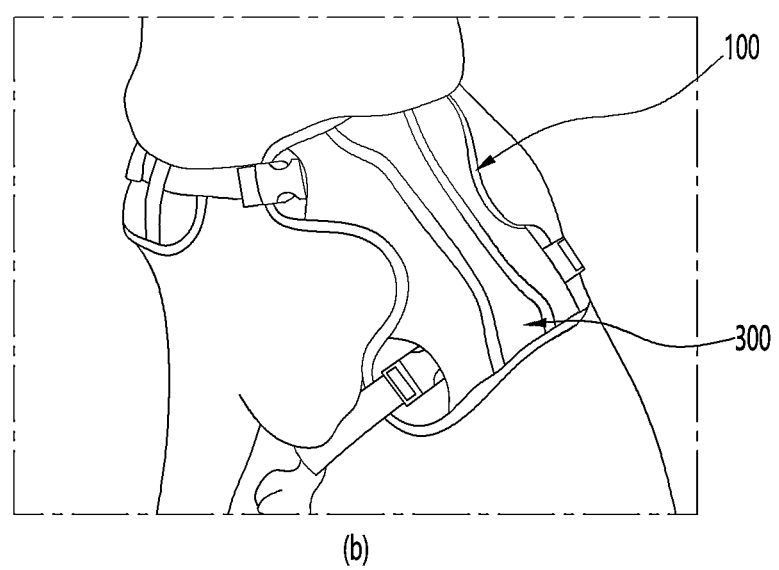
(b)

[Fig. 2]
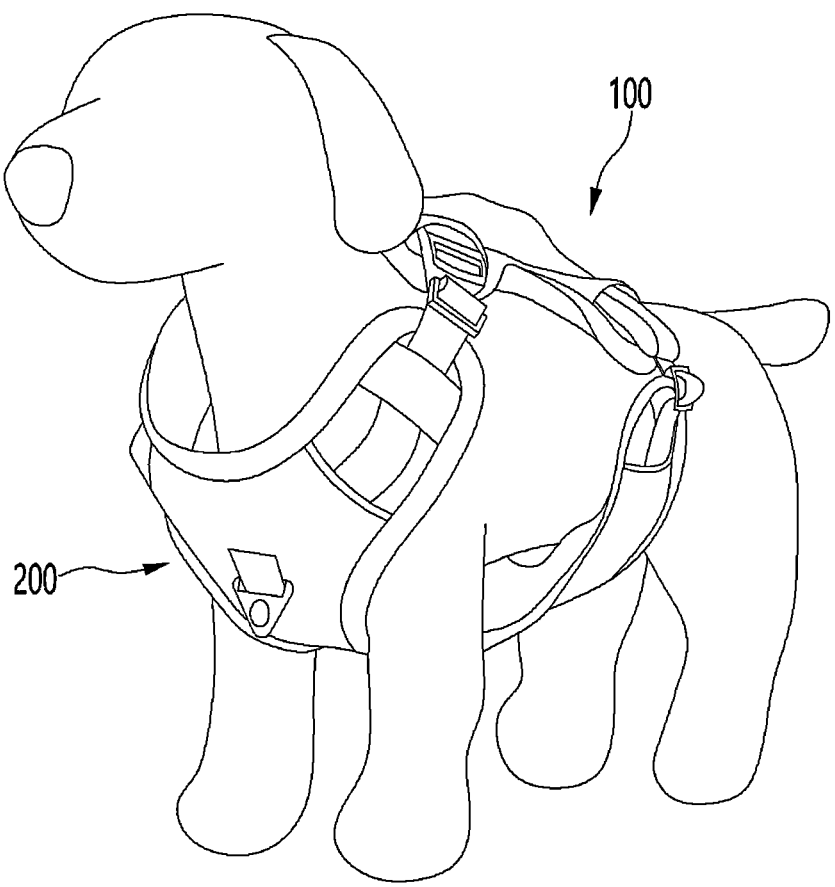

[Fig. 3]
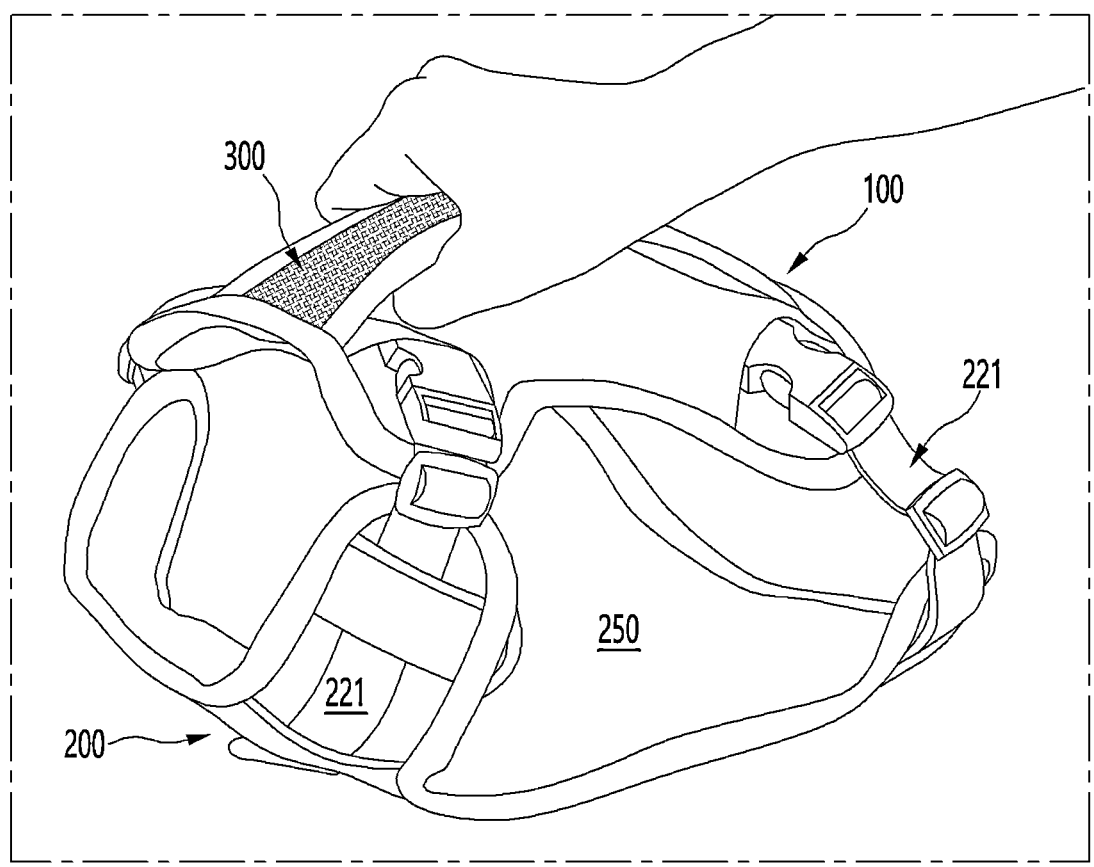

[Fig. 4]
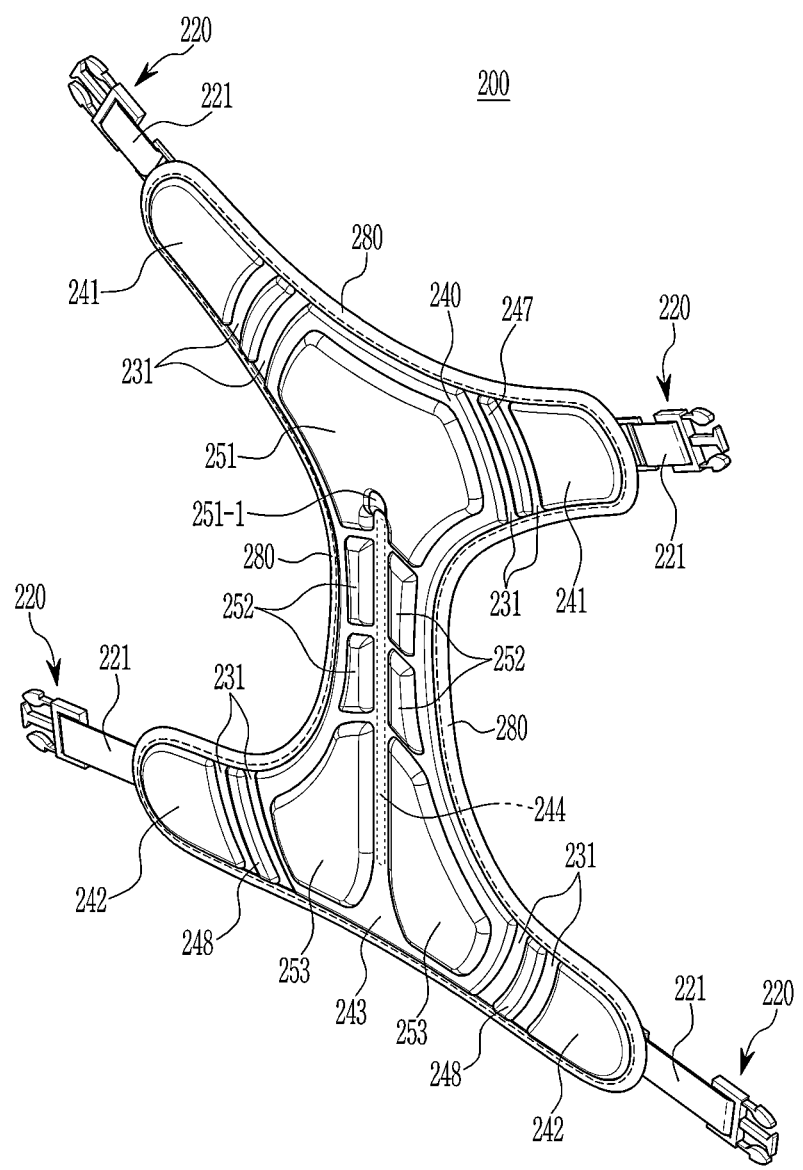

[Fig. 5]
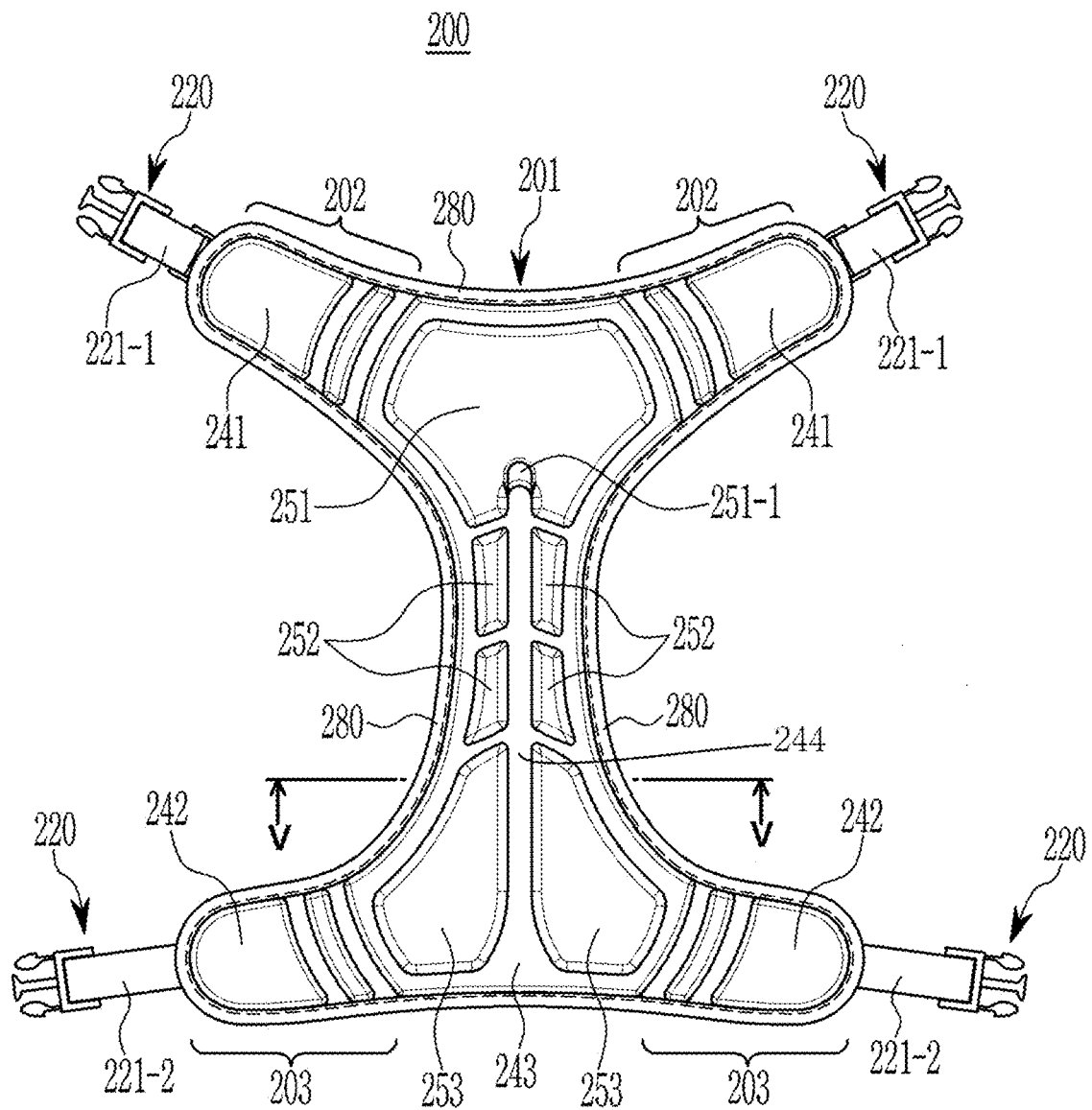

[Fig. 6]
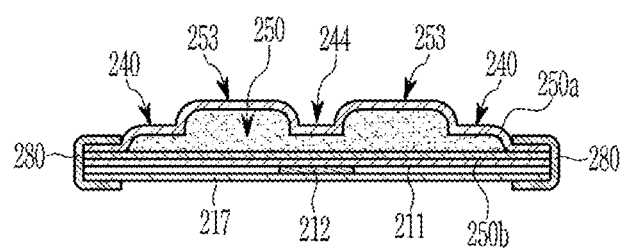

[Fig. 7]
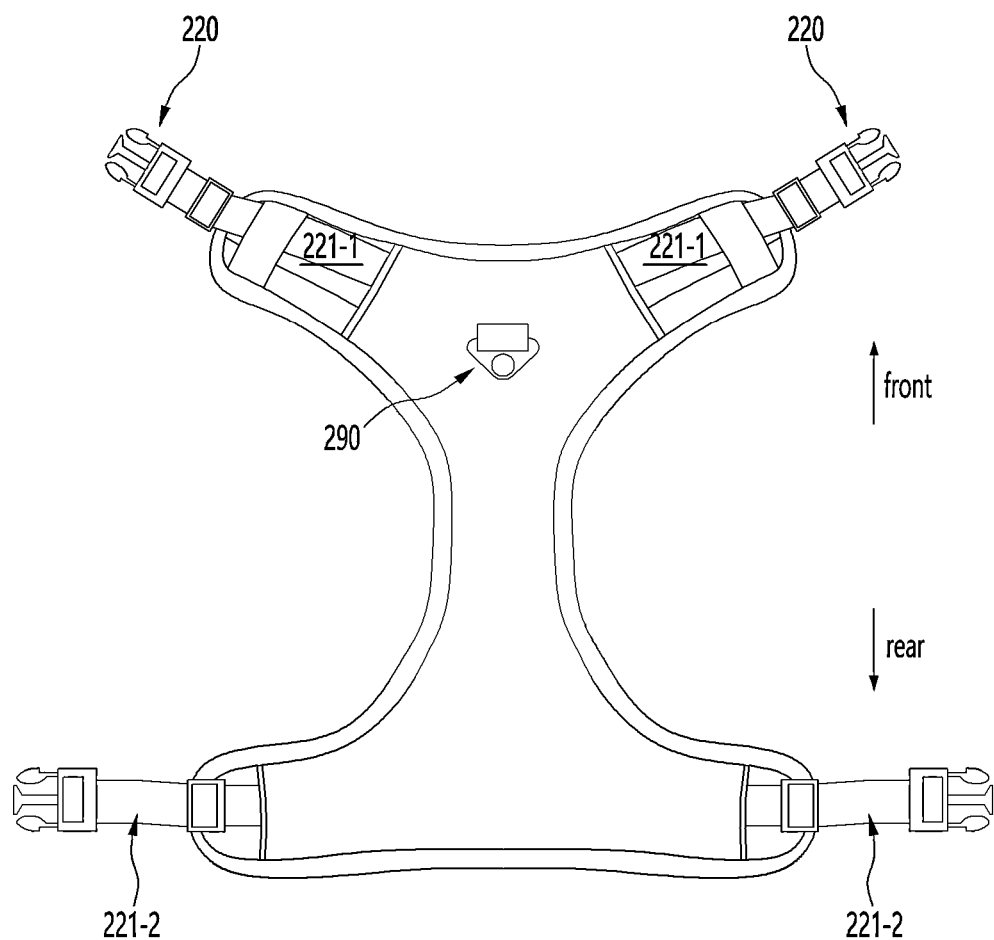

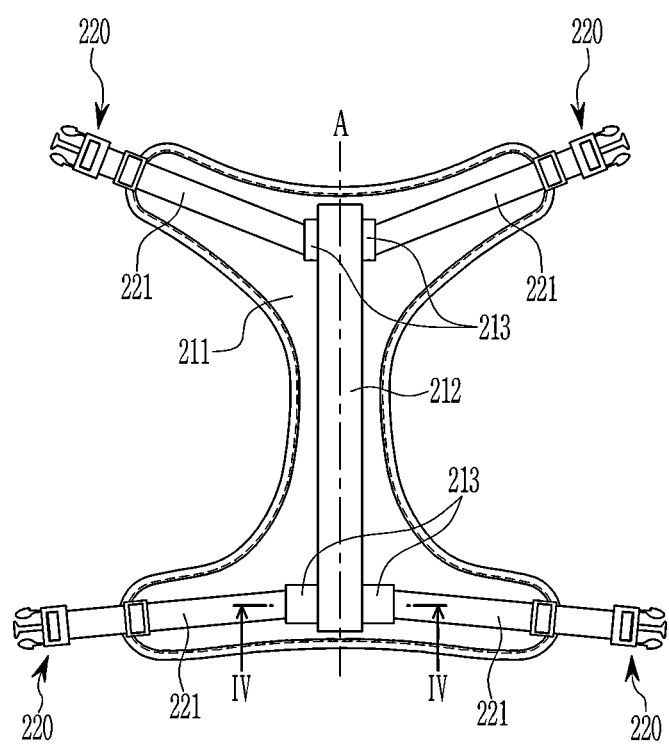
[Fig. 8]

[Fig. 9]
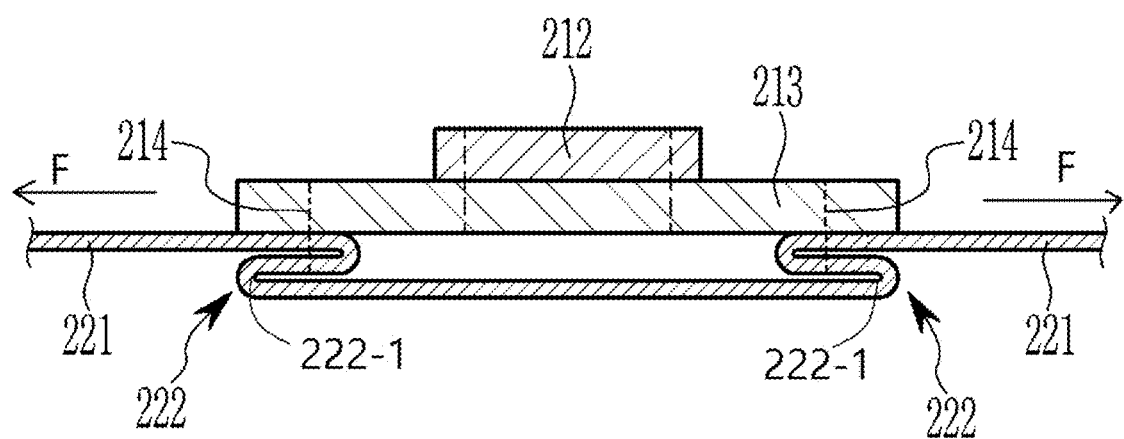

[Fig. 10]
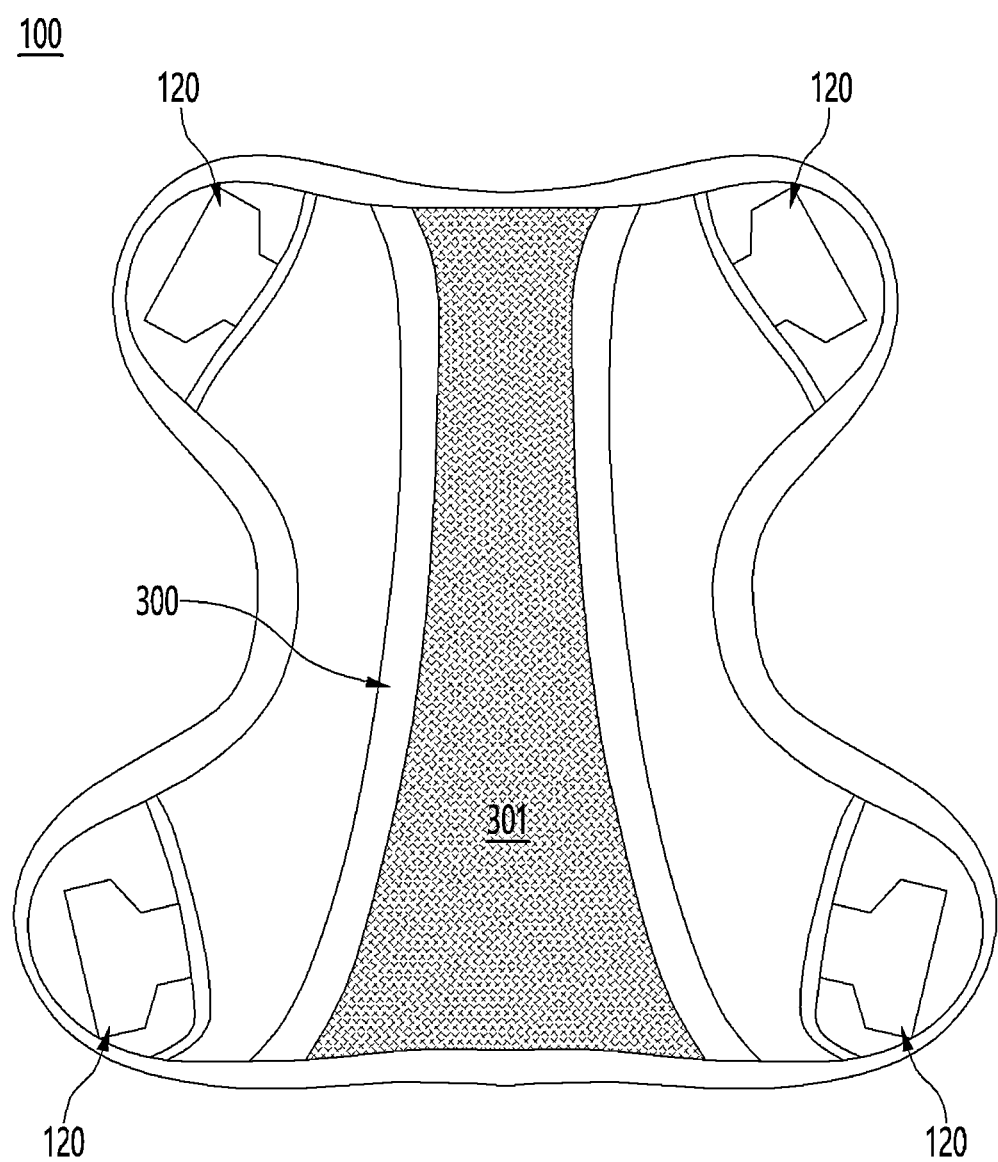

[Fig. 11]
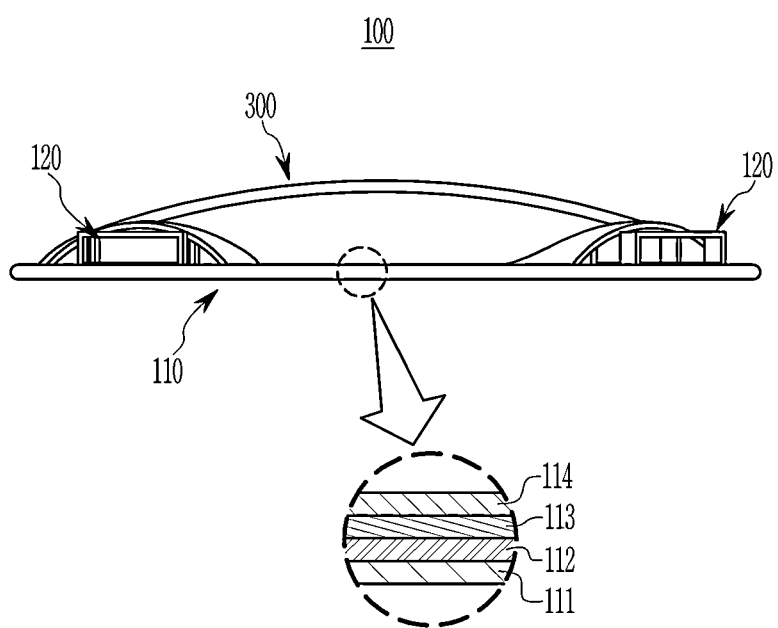

[Fig. 12]
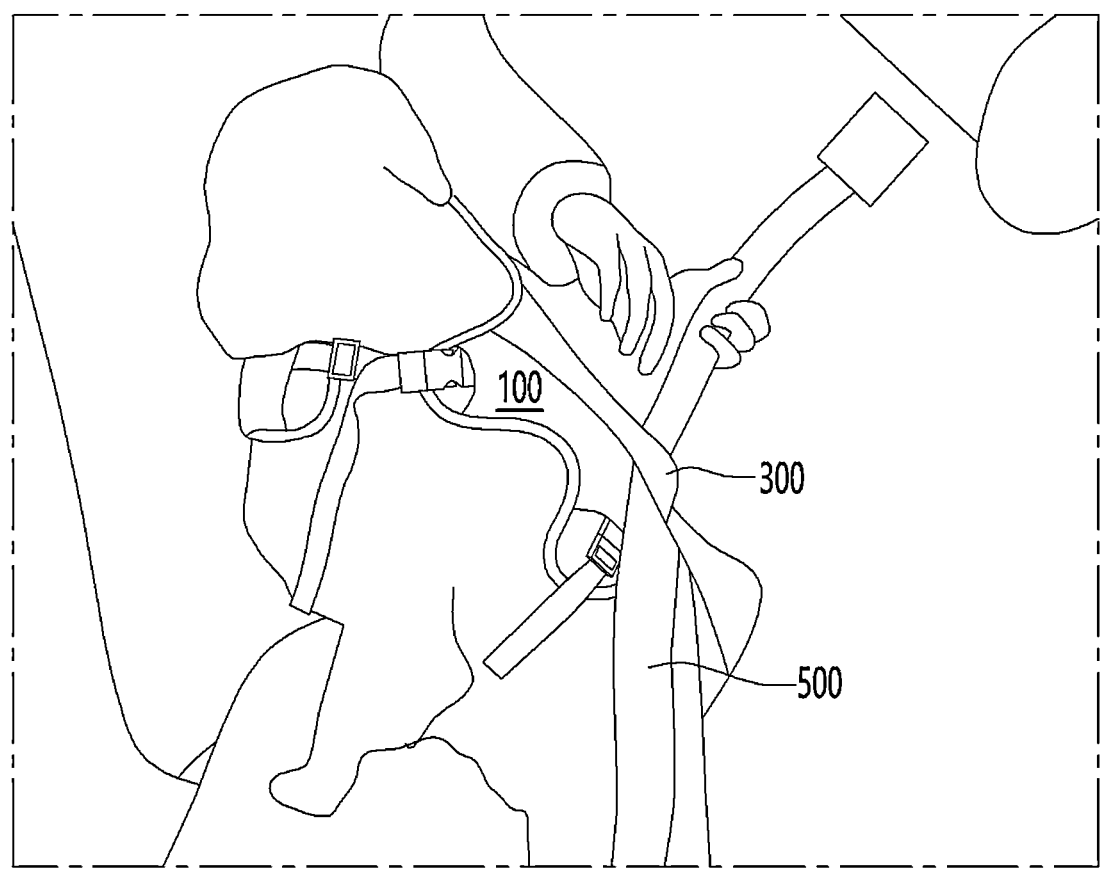

[Fig. 13]
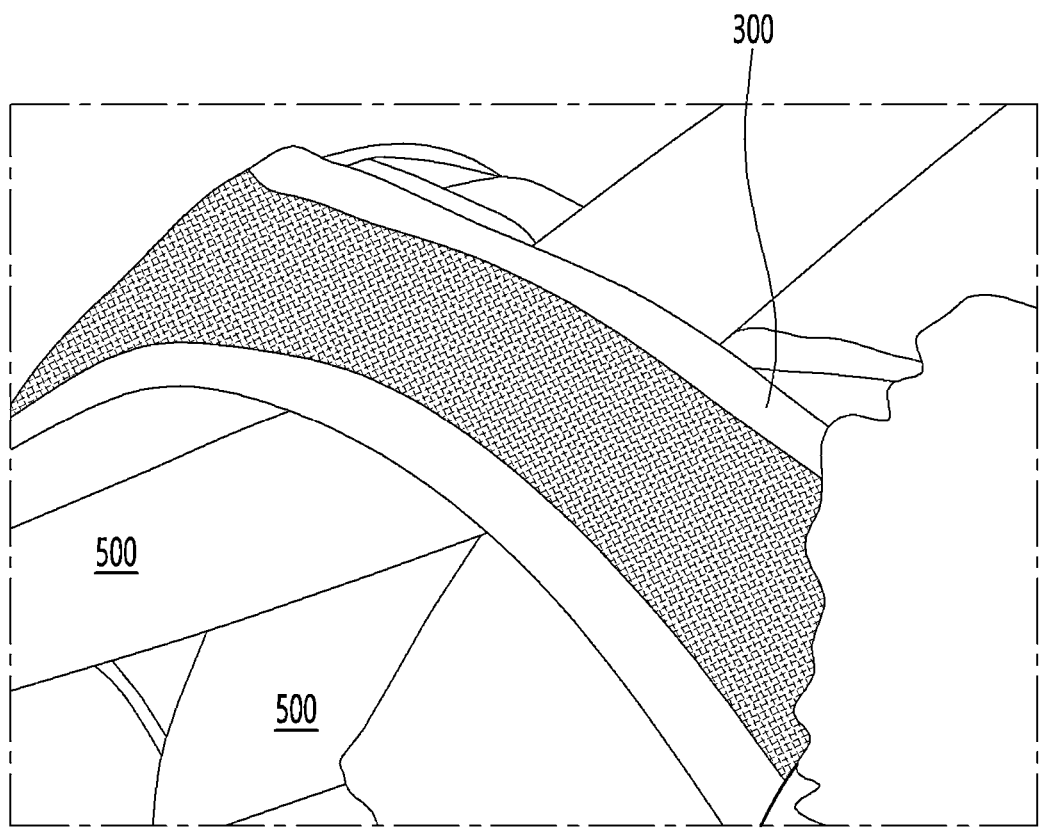

HARNESS FOR ANIMALS

CROSS-REFERENCE TO RELATED APPLICATION

This application claims priority from Korean Patent Application No. 10-2022- 0120212 on Sep. 22, 2022 filed in the Korean Intellectual Property Office, and all the benefits accruing therefrom under 35 U.S.C. 119, the contents of which in its entirety are herein incorporated by reference.

BACKGROUND OF THE INVENTION

Field of the Invention

The present invention relates to a harness for animals, and more particularly to a harness for pets having improved convenience and safety.

Description of the Related Art

Among pet supplies, a harness configured to be connected to a lead while wrapping the breast (anterior chest) and a part of the abdomen of a companion animal such that the animal goes for a walk, as a substitute for a lead, has been developed in various forms. The harness is mainly made of fabric, synthetic fiber, etc. since the harness wraps the shoulders and the chest of an animal, whereby force is distributed to the entirety of the upper half of the body of the animal, and therefore shock is reduced. For this reason, the fabric or synthetic fiber harness is widely used.

However, conventional harnesses for animals have simple shapes that do not consider the anatomical body structures of animals including a dog. Whenever a powerful animal rushes while pulling a dog leash during a walk, therefore, shock is applied to the chest of the animal even though a harness is worn, and the shock is not appropriately distributed.

In many cases, an animal, such as a dog or a cat, is moved using a car. Consequently, safety of a person as well as the animal may be threatened in a situation, such as sudden stop or sudden acceleration. Although car seats for animals are on the market, most of the car seats have a cage shape made of a cushion or a net, which merely absorbs small shock. Conventional car seats for animals do not have a function to safely fix the body while absorbing shock when strong shock, such as vehicle overturn or collision, is applied thereto, unlike a human body safety belt, and therefore safety of the conventional car seats is low.

Furthermore, for a medium-sized dog or a large-sized dog, it is difficult to get a suitable car seat for boarding a vehicle. The animal has to be placed in the conventional cushion cage type or net cage type car seat, and the car seat for large-sized dogs is too large, whereby it is difficult to mount the car seat to rear seats of the vehicle.

Therefore, there is a need for a product capable of securing convenience and safety when putting a companion animal, including a medium-sized dog or a large-sized dog, in a vehicle.

(Patent Document 1) KR 2395761 B

SUMMARY OF THE INVENTION

The present invention has been made in view of the above problems, and it is an object of the present invention to provide a harness for animals capable of distributing shock or load applied to the body of an animal when the harness is worn while having excellent comfort.

It is another object of the present invention to provide a harness capable of being easily fastened to a safety belt of a vehicle and securing safety of a companion animal wearing the harness.

In accordance with an aspect of the present invention, the above and other objects can be accomplished by the provision of a harness for animals, the harness including a chest rest configured to wrap a chest or the chest and a part of an abdomen of an animal. The chest rest may include a main body portion including a front area and a rear area each having a relatively large width and a middle area extending from the front area to the rear area, the middle area being long and narrow, and a plurality of bands coupled to the main body portion, each of the bands being provided at one end thereof with a first fastening member configured to perform fastening when the harness is worn.

A three-dimensional pattern may be formed in left-right symmetry at an inner surface of the chest rest that abuts the body of the animal when the chest rest is worn.

The width of each of the front area and the rear area may be relatively large, and the middle area disposed between the front area and the rear area may be concave and narrow. The chest rest may include a plurality of bands coupled to the main body portion, each of the bands being provided at one end thereof with a fastening member configured to perform fastening when the harness is worn.

The three-dimensional pattern may be formed such that high-density sponge has different thicknesses depending on area thereof. A first cushion portion may be formed at the front area, second cushion portions may be formed in left-right symmetry at opposite sides of the middle area based on a central axis of the main body portion, and a pair of third cushion portions may be formed in left-right symmetry at opposite sides of the rear area based on the central axis of the main body portion. A concave step portion may be formed at a rear middle of the first cushion portion.

The first cushion portion, the second cushion portions, and the third cushion portions, which are disposed spaced apart from each other, may have greater thicknesses than other areas of the main body portion, the area between the first to third cushion portions may be bent such that the chest rest is three-dimensionally brought into tight contact with the body shape of the animal when the harness is worn, and the first cushion portion may abut the breast of the animal when the harness is worn.

The main body portion may be formed so as to extend long in left-right symmetry based on the central axis thereof, and a concave step portion may be formed at the rear middle of the first cushion portion.

A central axis portion extending long rearwards from the step portion along the central axis of the main body portion may be formed, and one or more pairs of second cushion portions may be disposed in left-right symmetry in the state in which the central axis portion is interposed therebetween from the step portion.

A pair of front wing portions may be formed in left-right symmetry at opposite sides of the front area of the main body portion, and a pair of rear wing portions may be formed in left-right symmetry at opposite sides of the rear area of the main body portion. At the front and rear wing portions, wing cushion portions may be formed spaced apart from the first and third cushion portions, and the thicknesses of the wing cushion portions may be less than the thicknesses of the first to third cushion portions and greater than the thicknesses of other areas of the chest rest.

The chest rest may include a main body cover configured to perform a support function and a three-dimensional pattern unit coupled to the main body cover, and the three-dimensional pattern unit constituted by the three-dimensional pattern may be formed by compressing high-density sponge so as to have different thicknesses depending on area thereof.

A first cushion portion may be formed at a front area of the three-dimensional pattern unit, one or more pairs of second cushion portions may be formed in left-right symmetry at opposite sides of a middle area of the three-dimensional pattern unit based on the central axis of the main body portion, and a pair of third cushion portions may be formed in left-right symmetry at opposite sides of a rear area of the three-dimensional pattern unit based on the central axis of the main body portion.

The first to third cushion portions may have largest thicknesses in the three-dimensional pattern unit.

The chest rest may be configured by coupling a plurality of layers of fabric having the same edge outlines up and down, and a strip-shaped support portion extending long from the front to the rear of the chest rest along a central axis of the chest rest may be coupled to a lower surface of the main body cover located at a middle layer of the plurality of layers of fabric.

The bands may be coupled to a front part and a rear part of the support portion, an elastic member may be interposed between each band and the support portion, and the band may be connected to the support portion via the elastic member.

The elastic member may be disposed so as to be long left and right such that opposite ends of the elastic member protrude from the left and the right of the support portion, and the elastic member may be coupled to the support portion. The band may abut one surface of each of the protruding opposite ends of the elastic member, whereby double folded portions may be formed in left-right symmetry, and some folded layers of each of the double folded portions may be coupled to the one surface of the elastic member.

The harness may further include a backrest configured to be worn on a back area at the rear of a back neck of the animal, the backrest having second fastening members corresponding to the first fastening member, wherein the chest rest and the backrest may be separably coupled to each other via the first and second fastening members, A handle may be coupled to an upper surface of the backrest, the handle may have a long strip shape extending from the front to the rear thereof, and a front end and a rear end of the handle may be attached to the upper surface of the backrest so as to be held at left and right sides. Non-clip coatings may be formed on upper and lower surfaces of the handle as patterns.

In accordance with another aspect of the present invention, there is provided a harness for animals, the harness including a chest rest configured to wrap the chest of an animal and a backrest having a handle coupled thereto. The chest rest and the backrest may be separably coupled to each other via a band and a fastening member, and a three-dimensional pattern may be formed at an inner surface of the chest rest brought into tight contact with the chest of the animal when the chest rest is worn.

The three-dimensional pattern may be formed in left-right symmetry and may include a first cushion portion formed at the middle of a front area of the chest rest, a third cushion portion formed at a rear area of the chest rest, and a second cushion portion formed between the first cushion portion and the third cushion portion in left-right symmetry.

In accordance with a further aspect of the present invention, there is provided a three-dimensional pattern unit for chest rests of a harness for animals, the three-dimensional pattern unit being disposed at an inner surface of a chest rest so as to abut the body of an animal when the harness is worn.

The three-dimensional pattern unit may be formed by compressing high-density sponge so as to have different thicknesses depending on area thereof such that a three-dimensional pattern is formed in left-right symmetry, and the three-dimensional pattern unit may include a main body portion including a front area and a rear area each having a relatively large width and a middle area extending from the front area to the rear area, the middle area being long and narrow, two front wing portions formed in left-right symmetry at opposite sides of the front area of the main body portion, and two rear wing portions formed in left-right symmetry at opposite sides of the rear area of the main body portion.

A plurality of cushion portions is formed at one surface of the three-dimensional pattern unit in left-right symmetry based on a central axis of the main body portion. The plurality of cushion portions may be disposed spaced apart from each other, the area between the plurality of cushion portions may be bent such that the chest rest is three-dimensionally brought into tight contact with a body shape of the animal when the harness is worn, and the plurality of cushion portions may have greater thicknesses than peripheries of the cushion portions.

BRIEF DESCRIPTION OF THE DRAWINGS

The above and other objects, features and other advantages of the present invention will be more clearly understood from the following detailed description taken in conjunction with the accompanying drawings, in which:

FIG. 1 shows the state in which a companion dog wears a harness for animals according to an embodiment of the present invention, wherein FIG. 1(a) is a side photograph of the companion dog wearing the harness for animals and FIG. 1(b) is a rear upper photograph of the companion dog wearing the harness for animals;

FIG. 2 is a photograph showing the state in which the harness for animals according to the embodiment of the present invention is worn on a stuffed companion dog;

FIG. 3 is a photograph showing the state in which a person holds a backrest handle of the harness in the state in which a backrest and a chest rest are coupled to each other by buckling;

FIG. 4 is a perspective view showing an inner surface of a chest rest according to an embodiment of the present invention configured to be brought into tight contact with the chest of an animal when worn;

FIG. 5 is a plan view showing an embodiment of the inner surface of the chest rest according to the present invention configured to be brought into tight contact with the chest of the animal when worn;

FIG. 6 is a sectional view taken along line V-V of FIG. 5;

FIG. 7 shows an outer surface of the chest rest according to the embodiment of the present invention;

FIG. 8 is a view showing the interior of the chest rest according to the embodiment of the present invention;

FIG. 9 is a sectional view taken along line IV-IV of FIG. 8;

FIG. 10 is a photograph showing an outer surface of a backrest according to an embodiment of the present invention;

FIG. 11 is a side view of the backrest according to the embodiment of the present invention;

FIG. 12 is a photograph showing the state in which the backrest handle of the harness is coupled to a safety belt in the state in which a companion dog wearing the harness according to the embodiment of the present invention is put in a vehicle; and FIG. 13 is a photograph showing the backrest handle of the harness and the safety belt in the state in which the backrest handle is coupled to the safety belt in the state in which the companion dog wearing the harness according to the embodiment of the present invention is put in the vehicle.

DETAILED DESCRIPTION OF THE INVENTION

The terms used (mentioned) in this specification are provided only to explain embodiments, but are not intended to restrict the present invention. In this specification, a singular representation may include a plural representation unless particularly mentioned, and a component and an operation mentioned using the term "comprises (or has)" do not preclude the presence or addition of one or more other components and operations.

Unless otherwise defined, all terms (including technical and scientific terms) used in this specification have the same meanings as those commonly understood by a person having ordinary skill in the art to which the present invention pertains.

Hereinafter, embodiments of the present invention will be described with reference to the accompanying drawings.

FIG. 1 shows the state in which a companion dog wears a harness for animals according to an embodiment of the present invention, wherein FIG. 1(a) is a side photograph of the companion dog wearing the harness for animals and FIG. 1(b) is a rear upper photograph of the companion dog wearing the harness for animals. FIG. 2 is a photograph showing the state in which the harness for animals according to the embodiment of the present invention is worn on a stuffed companion dog. FIG. 3 is a photograph showing the state in which a person holds a backrest handle of the harness in the state in which a backrest and a chest rest are coupled to each other by buckling Referring to FIGS. 1 to 3, the harness according to the embodiment of the present invention includes a chest rest 200 configured to wrap the breast of an animal and a backrest 100 separably coupled to the chest rest. The chest rest 200 has four bands 221, each of which is provided at the end thereof with a first fastening member 220, and the backrest 100 has four second fastening members 120 corresponding respectively to the first fastening members. The first and second fastening members are separably coupled to each other. One or more of the first fastening members are fastened to corresponding ones of the second fastening members in the state in which the breast of the companion dog and a part of the abdomen of the companion dog are wrapped by the chest rest and the backrest is disposed from the back neck to the back of the companion dog, whereby the harness is worn on the animal.

As shown in FIGS. 3 to 5, the chest rest 200 of the present invention is configured such that two front bands 221-1 are symmetrically disposed at front opposite sides thereof and two rear bands 221-2 are symmetrically disposed at rear opposite sides thereof. One end of each of the front bands and the rear bands is coupled to a main body or a wing portion of the chest rest, and a convex end joint 220 is coupled to the other end thereof. A total of four convex end joints 220 may be separably coupled to concave end joints 120 provided at corresponding positions of the backrest, respectively. Although the chest rest and the backrest are separably coupled to each other by buckling in the embodiment of the present invention, the present invention is not limited thereto, and coupling therebetween may be performed using other separable fastening means, such as Velcro tape or a button.

Hereinafter, the structure of a chest rest according to an embodiment of the present invention will be described in detail with reference to FIGS. 4 to 6. FIG. 4 is a perspective view showing an inner surface of a chest rest according to an embodiment of the present invention configured to be brought into tight contact with the breast or an area from the breast to a part of the abdomen (hereinafter referred to as the chest) of an animal when worn. FIG. 5 is a plan view showing an embodiment of the inner surface of the chest rest according to the present invention configured to be brought into tight contact with the chest of the animal when worn. FIG. 6 is a sectional view taken along line V-V of FIG. 5.

Referring to FIG. 5, the chest rest is formed so as to be long in a forward-rearward direction, and includes a main body portion 201, two front wing portions 202 formed respectively at front left and right sides of the main body portion, two rear wing portions 203 formed respectively at rear left and right sides of the main body portion, a band 221 extending from an outer end of each of the four wing portions, and a first fastening member (convex end joint) 220 coupled to the band. The band and the convex end joint 220 extend from each of the front and rear wing portions 202 and 203.

When the harness is worn, the main body portion 201 is brought into tight contact with the chest of the animal, and the front wing portions 202 extend upwards from the front of forelegs of the animal toward the backrest. When the harness is worn, left and right forelegs of the animal are located between the left and right front wing portions 202 and the left and right rear wing portions 203, respectively. That is, the front wing portions 202 extend from the fronts of the forelegs toward the back, and the rear wing portions 203 extend from the rears of the forelegs toward the back.

The main body portion 201 includes a front area and a rear area each having a relatively large width and a middle area extending from the front area to the rear area, the middle area being long and narrow. The two front wing portions 202 are symmetrically formed at left and right sides of the front area, and the two rear wing portions 203 are formed at left and right sides of the rear area of the main body portion.

Referring to the sectional view of FIG. 6, the chest rest 200 is constituted by a plurality of layers formed from an inner surface thereof that faces the breast (or the breast and a part of the abdomen) of the companion animal when the harness is worn to an outer surface thereof. The chest rest 200 is constituted by a three-dimensional pattern unit 250 (250a and 250b), a main body cover 211, and an outer cover 217 coupled to each other while being sequentially disposed from the inner surface to the outer surface thereof.

The three-dimensional pattern unit 250 (250a and 250b) and the main body cover 211 are coupled to each other by sewing upper and lower fabric sheets having the same edge outlines, and the overall outline of each of the three-dimensional pattern unit 250 (250a and 250b) and the main body cover 211 is identical to the outline of the chest rest.

That is, each of the three-dimensional pattern unit and the main body cover equally includes the main body portion and the front and rear wing portions, and the chest rest is formed by coupling the three-dimensional pattern unit and the main body portion having the same edges by sewing in an overlapping state.

The edges of the three-dimensional pattern unit 250 (250*a* and 250*b*) and the main body cover 211 are sewed in a state of being wrapped by an edge portion 280. The edge portion 280, which is made of fabric having a predetermined width, may be made of the same fabric as the main body cover. The main body cover is made of fabric that is little deformable and has high strength in order to support the chest rest while maintaining the shape thereof, such as poly nylon. One surface of the main body cover is coupled to the three-dimensional pattern unit only at the edge portion or at the edge portion and a part thereof while facing the three-dimensional pattern unit to support the three-dimensional pattern unit such that the three-dimensional pattern unit is deformable. The other surface of the main body cover, which is configured to be directly or indirectly coupled to the bands, may be a single layer of fabric having high strength or two layers of fabric having the same shapes coupled to each other by sewing.

The bands 221 and a support portion 212 are coupled to each other at specific positions between the main body cover 211 and the outer cover 217. The structures of the bands and the support portions will be described below.

The three-dimensional pattern unit is manufactured by pressing two upper and lower layers of elastic covers 250*a* and 250*b* and a high-density sponge layer 250 disposed therebetween. Each of the two layers of elastic covers 250*a* and 250*b* may be made of fabric having high elasticity, such as four-way stretch poly urethane fabric, preferably Lycra (Product name). The high-density sponge layer 250 may have different thicknesses depending on the area thereof.

The three-dimensional pattern unit 250, which defines one surface of the chest rest described above, defines the outline of the chest rest. The three-dimensional pattern unit 250 includes a main body portion 240 extending long in the forward-rearward direction, the main body portion being configured such that a middle area between front and rear areas thereof is narrow, two front wing cushion portions 241 formed at front left and rights sides of the main body portion, and two rear wing cushion portions 242 formed at rear left and rights sides of the main body portion.

A first cushion portion 251 is formed at a front middle area of the main body portion 240, and a pair of third cushion portions 253 is left-right symmetrically formed at opposite sides of a rear area based on a central axis of the main body portion. One or more pairs of second cushion portions 252 are left-right symmetrically formed at opposite sides of a middle area, which connects the front middle area and the rear area to each other, based on the central axis of the main body portion. The central axis of the main body portion, which is an axis based on which the three-dimensional pattern unit 250 and the chest rest 200 are left-right symmetrically disposed, is an imaginary axis extending long in the forward-rearward direction.

The thickness H1 of each of the first cushion portion 251, the second cushion portions 252, and the third cushion portions 253 is greater than the thickness of the other area of the main body 240.

An step portion 251-1 is formed concave at a rear middle of the first cushion portion 251, and the step portion 251-1 has a smaller thickness than the first cushion portion 251. The step portion 251-1 may be formed so as to have two steps, as shown in FIG. 5.

Meanwhile, as shown in FIG. 4, a central axis portion 244 is formed so as to extend long from the step portion along the central axis. The second cushion portions 252 are formed in left-right symmetry in the state in which the central axis portion 244 is interposed therebetween. Referring to FIGS. 4 and 5, two pairs of second cushion portions 252 are formed so as to protrude in left-right symmetry in the state in which the central axis portion 244 is interposed therebetween. The second cushion portions 252 may be formed so as to extend long in a quadrangular shape along the central axis, and front and rear surfaces thereof may be inclined outwards. Alternatively, one pair or three pairs of second cushion portions 252 may be formed instead of the two pairs of second cushion portions.

A rear area of the main body portion includes a part of the central axis portion 244, and the width thereof is increased toward the rear thereof. At the rear area of the main body portion, the pair of third cushion portions 253 is formed at the left and right of the central axis portion 244. The pair of third cushion portions 253 is disposed at opposite sides of the central axis portion 244, and the surface thereof that faces the central axis extends long rearwards to form an arc shape. A rear central portion 243 is located on an extension line of the central axis portion 244 in front thereof, but the width thereof is greater than that of the central axis portion. When the harness is worn, the rear central portion 243 of the chest rest contacts a lower part of the sternum of the animal, and the third cushion portions 253 contact the sternum of the animal. The third cushion portions are formed so as to correspond to the shape of the rear area.

The pair of third cushion portions 253 is formed spaced apart from each other in left-right symmetry in the state in which the central axis portion 244 is interposed therebetween, each of the third cushion portions extends long from the front thereof sp as to have a width gradually increased toward the rear thereof. The surfaces of the pair of third cushion portions 253 that face the central axis extend so as to be spaced apart from each other by the same distance along the central axis portion at the fronts thereof, and the rears thereof extend outwards in the state in which the rear central portion 243 is interposed therebetween. In contrast, the surface of the pair of third cushion portions that face the outside, not the central axis, extends outwards while being enlarged into an arc shape.

Meanwhile, a predetermined area of the main body portion 240 is formed at outer circumferences of the first to third cushion portions 251, 252, and 253, and the thickness H2 of this outer edge area is less than the thickness of each of the first to third cushion portions 251, 252, and 253.

The central axis portion 244 of the main body portion may be formed at the rear of the first cushion portion so as to extend long along the central axis, and the thickness H6 thereof may be equal to or less than the thickness H2.

Meanwhile, the pair of front wing cushion portions 241 formed at the front left and rights sides of the main body portion 240 extends outwards from the left and rights sides of the main body portion in symmetry. Each of the front wing cushion portions 241 is connected to the main body portion 240 in the state in which an intermediate portion 247 is interposed therebetween. Recesses 231 are formed at opposite sides of the intermediate portion, and the intermediate portion 247 is connected to the main body portion in the state in which an inner recess is interposed therebetween and is connected to the front wing cushion portion 241 in the state in which an outer recess is interposed therebetween.

The pair of rear wing cushion portions 242 formed at the rear left and rights sides of the main body portion 240 extends outwards from the left and rights sides of the main body portion in symmetry. Each of the rear wing cushion portions 242 is connected to the main body portion 240 in the state in which an intermediate portion 248 is interposed therebetween. Recesses 231 are formed at opposite sides of the intermediate portion, and the intermediate portion 248 is connected to the main body portion in the state in which an inner recess is interposed therebetween and is connected to the rear wing cushion portion 242 in the state in which an outer recess is interposed therebetween.

In the embodiment of the present invention, the thickness H2 of each of the front and rear wing cushion portions 241 and 242, the intermediate portions 247 and 248, and the main body portion 240 is 10 mm based on a lower surface of the three-dimensional pattern unit, the thickness H1 of each of the first to third cushion portions 251, 252, and 253 is 18 mm, the thickness H3 of the step portion is 15 mm, the thickness H4 of the recess 231 is 6 mm, and the thickness H5 of the edge portion is 2 mm.

Preferably, H1>H3>H2≥H6>H4>H5.

As shown in FIG. 6, the three-dimensional pattern unit is manufactured by pressing two upper and lower layers of elastic covers 250a and 250b made of elastic fabric and a high-density sponge layer 250 disposed therebetween. Three layers of high-density sponge may be disposed for the cushion portion including the first to third cushion portions 251, 252, and 253, and two layers of sponge may be disposed for the front and rear wing cushion portions 241 and 242, the intermediate portions 247 and 248, and the main body portion 240. That is, the thickness of the high-density sponge may be varied depending on the thickness of each area, and the three-dimensional pattern may be formed by pressing, as described above.

When the three-dimensional pattern unit has the above structure, it is possible to provide a three-dimensional chest rest suitable for the three-dimensional shape of the body of an animal. The three-dimensional pattern unit, which has a flap shape having partially protruding shapes, is formed using the elastic fabric and the high-density sponge, whereby the three-dimensional pattern unit is easily formed so as to have a three-dimensional shape. When the finished harness is worn, the three-dimensional pattern unit is disposed at the surface of the chest rest that directly contacts the body of the animal, and is easily deformed into a three-dimensional shape so as to correspond to the chest, shoulder, a part of the abdomen, and the ribs of the animal. That is, when the harness is worn, the first cushion portion 251 is brought into tight contact with the anterior chest, the second cushion portions 252 are brought into tight contact with an area between forelegs, and the third cushion portions 253 are brought into tight contact with opposite sides of the lower ones of the ribs.

The first to third cushion portions are portions at which great shock is applied to the body of the animal when force is applied to the harness via a lead string fastened to a handle of the backrest of the harness or a ring 290, a description of which will follow. In addition, the main body central axis portion 244, which has a small thickness, is disposed at the central axis of each of the second cushion portions and the third cushion portions, whereby the left and right sides of the cushion portions are easily three-dimensionally deformed upwards based on the main body central axis portion 244. As a result, the cushion portions are sufficiently brought into tight contact with the body of the animal and absorb shock since the cushion portions have elastic absorptivity while being thicker than the other portions.

Meanwhile, the third cushion portions extend long rearwards and outwards in left-right symmetry to protect the ribs when worn, and a rear central portion 243 is formed at a lower part thereof such that a thin empty space is formed. Since the thickness of the rear central portion 243 is relatively small, the left and right third cushion portions are folded upwards, whereby the third cushion portions are easily deformed into a three-dimensional shape. At the same time, the third cushion portions may absorb external shock applied to the lower ones of the ribs. In addition, since the rear central portion 243 is thinner than the left and right third cushion portions, the rear central portion does not directly contact a weak region of the lower ones of the ribs when worn, whereby it is possible to reduce shock.

In order to maximize the function of the harness to absorb shock applied to the harness while being easily controlled, the chest rest of the harness must be brought into tight contact with the body of the animal while sufficiently absorbing shock when worn. The three-dimensional pattern unit according to the embodiment of the present invention has a structure enabling the same. When the harness is worn, the area between the first to third cushion portions is bent, whereby it is possible for the chest rest to be brought into tight contact with the body of the animal so as to three-dimensionally correspond to the shape thereof. That is, the thickness H3 of the step portion 251-1 located at the rear middle of the first cushion portion is less than the thicknesses of the cushion portions and is greater than the thicknesses of the areas of the main body portion excluding the cushion portion including the central axis portion 244. Due to distribution in thickness of the three-dimensional pattern unit of the chest rest, the three-dimensional pattern unit is easily deformed so as to correspond to the curved shapes of the chest, an area between the opposite forelegs, a front part of the abdomen, and opposite ribs when the harness is worn, whereby the three-dimensional pattern unit is brought into tight contact with the body of the animal. In addition, since the three-dimensional pattern unit is constituted by the elastic fabric and the high-density sponge, the three-dimensional pattern unit is more easily deformed.

Meanwhile, the edge portion of the main body portion is wrapped by fabric having high strength such that the shape thereof is maintained, but the thickness of the edge portion is less than the thicknesses of the main body portion and the wing portions. As a result, when the harness is worn, the edge portion does not abut the skin of the animal but abuts hair of the animal. Strong shock may be applied in the state in which the lead string is connected to the handle or the ring 290 provided at the lower surface of the chest rest (the surface of the chest rest that is not brought into tight contact with the body of the animal) or a safety belt 500 is fastened to the handle 300 in the state in which the harness is worn. For a conventional harness, the thickness of the edge portion of the chest rest is similar to the thickness of the main body portion, whereby the skin of the animal may be rubbed by the edge portion when the lead string is pulled. For the chest rest of the present invention, however, even when the chest rest is pulled in one direction or shock is applied to the chest rest, the shock is mainly concentrated on the cushion portions and the edge portion does not strongly collide with the skin of the animal due to the above structure, whereby the skin of the animal is not rubbed. Hereinafter, the coupling structure between the bands 221 and the main body cover will be described in detail with reference to FIGS. 6 to 9.

Referring to FIG. 6, the main body cover 211 is coupled to a lower part of the three-dimensional pattern unit 250, the support portion 212 is coupled to a power part of the main body cover, and the outer cover 217 is coupled to a lower part of the support portion. Edges of the three-dimensional pattern unit 250 (250a and 250b), the main body cover 211, and the outer cover 217 are sewed while being wrapped by the edge portion 280. The edge portion 280 is made of fabric having high strength, as the main body cover, in order to effectively protect the components wrapped thereby.

FIG. 7 is a photograph showing an outer surface of the chest rest according to the embodiment of the present invention.

The outer surface of the chest rest according to the embodiment of the present invention shown in FIG. 7 is the surface that does not abut the body of the animal but is exposed to the outside when the harness is worn. Referring to FIG. 7, the outer cover 217 is coupled in a shape that partially covers the wing portions of the main body cover in a partially open state.

FIG. 8 is a view showing the interior of the chest rest in the state in which the outer cover 217 is removed from the photograph of FIG. 7. Referring to FIG. 8, the support portion 212, which is formed in a strip shape extending long from the front to the rear of the chest rest along the central axis A thereof, is fixed to the lower surface (outer surface) of the main body cover 211. The four front and rear bands 221 are fixed to the support portion 212, and the support portion is fixed to the lower surface of the main body cover 211 coupled to the lower part of the three-dimensional pattern unit. It is preferable for such fixation to be performed at left and right sides thereof along the central axis by two-line sewing. The support portion 212 may be made of fabric that has high strength, such as poly nylon, like the main body cover 211.

FIG. 9 is a sectional view taken along line IV-IV of FIG. 8. The coupling structure between the bands 221 and the support portion 212 will be described in detail with reference to FIG. 9. As shown in FIGS. 8 and 9, the front bands 221 are coupled to a front part of the support portion 212, and the rear bands 221 are coupled to a rear part of the support portion 212. The two front bands may be integrally formed, and the two rear bands may also be integrally formed.

Referring to FIG. 9, an elastic member 213 is coupled to one surface of the support portion 212 (the upper surface based on FIGS. 5 and 6 and the lower surface based on FIG. 9; hereinafter, one surface will be described as the lower surface for sake of convenience) by sewing. The elastic member 213 is made of a material that has high elasticity and force of restoration, including rubber or silicone. The elastic member 213 is coupled to a lower surface of the support portion by sewing (a dotted line) in left-right symmetry such that opposite ends thereof protrude from the support portion.

Double folded portions 222 of a single band 221 are formed at lower surfaces of the protruding opposite ends of the elastic member 213 in left-right symmetry, and are coupled to the opposite ends of the elastic member by sewing 214. The single band is partially folded from opposite outsides of the elastic member toward a central axis of the support portion 212, is primarily folded at lower parts thereof and extends outwards, and is secondarily folded at lower parts of the opposite ends of the elastic member toward the inside thereof, whereby the double folded portions 222 are formed at the lower surfaces of the protruding opposite ends of the elastic member 213. The band secondarily folded at the opposite ends, as described above, extends along the central axis to form a single band. Each of the double folded portions 222 forms triple overlapping layers of the band, and is coupled to the lower surface of the elastic member 213 by sewing 214 at a predetermined part of a double overlapping layer adjacent to the elastic member.

In the coupling structure among the double folded portions, the elastic member 213, and the support portion 212, when force F due to external shock is applied to the band, the force is absorbed by elastic force of the elastic member. That is, external shock applied via the handle is transmitted to the band 221 in a manner in which the band is pulled to the outside in FIG. 8. When lower than a predetermined level of force is applied, the elastic member 213 coupled to the band 221 extends to absorb shock. At this time, the elastic member 213 extends in the direction in which the force F is applied, and the secondary folded portion 222-1 having no sewing of each of the double folded portions is unfolded, whereby coupling between the elastic member and the band is maintained without breakage of the sewing 214. At this time, force due to external shock is partially absorbed by the elastic member and is transmitted to the main body cover 211 and the three-dimensional pattern unit via the support portion 212. In addition, even when external shock is nonuniformly applied to the four bands, the shock is primarily distributed in four directions (the direction in which the four bands are coupled) via the support portion fixed to the main body cover and the elastic member, whereby the shock is reduced. Secondarily, the shock is absorbed by the cushion portions of the three-dimensional pattern unit, whereby the shock applied to the body of the animal is reduced.

In particular, when the harness is coupled to the safety belt 500 of the vehicle, excessive shock is applied to the handle of the backrest of the harness in an accident situation, such as sudden stop or collision, and the shock is transmitted to the bands. At this time, the shock applied to the animal wearing the harness is absorbed through the above structure while the shock is uniformly distributed. That is, the shock is distributed to the front and rear bands from the support portion 212 disposed at the central axis of the chest rest via a specific band. As an example of coupling of the safety belt, an embodiment in which the safety belt is coupled to the harness is shown in FIGS. 12 and 13. Referring to FIGS. 12 and 13, the safety belt 500 may be coupled to the harness via the handle 300 of the backrest 100 fastened to the chest rest 200.

Meanwhile, when external force applied to the band exceeds the elastic limit of the elastic member or the coupling force of the sewing 214 of the double folded portion, coupling of the sewing 214 between the double folded portion and the elastic member is broken. In this case, the double folded portion of the band is unfolded in a straight line, whereby the length of the band is slightly further increased. During this process, the shock is absorbed, and extension of the band to more than a predetermined length is prevented. In particular, when the harness is coupled to the safety belt of the vehicle, the elastic member absorbs the shock in the early stage in an accident situation, such as sudden stop or collision, the force is reduced while breaking the coupling of the sewing 214, and extension of the band to more than a predetermined length is prevented as the double folded portion is unfolded in a straight line, whereby movement of the animal wearing the harness is restricted, and therefore safety of the animal is guaranteed.

Referring to FIG. 8, the front bands and the rear bands form double folded portions through the medium of the elastic member and are coupled to the front part and the rear part of the support portion. However, only one of the front bands or the rear bands may form double folded portions through the medium of the elastic member.

Hereinafter, the backrest of the harness according to the embodiment of the present invention will be described in detail with reference to FIGS. 10 and 11.

The backrest 100, which is configured to be worn on the back of the animal, is separably coupled to the chest rest 200, and has a handle 300 extending long from the front to the rear thereof. The backrest 100 is an appropriately quadrangular plate that has a predetermined thickness configured such that four corners protrude convex and is made of fabric.

The backrest 100 has four second fastening members (concave end joints) 120, configured to be separably coupled to the four first fastening members of the chest rest, provided at a front side and a rear side thereof in left-right symmetry. The backrest, which is fastened to the chest rest via a fastening member in a state of being worn on the back of the animal at the rear of the back neck thereof, is made of fabric, and includes a first layer 111 made of air mesh, a second layer 112 made of fabric having high strength, such as poly nylon (e.g. Toilon (Product name)), a third layer 113 forming a support portion, and a fourth layer 114 including a backrest cover sequentially disposed from a lower surface thereof that abuts the animal. The first to third layers, which are made of quadrangular fabric sheets having the same shapes in which four corners protrude convex, are sewed at edges thereof by edge cloth having high strength so as to be coupled into a single body. The fourth layer has the same shape as the first to third layers but is configured such that incision portions are formed in four corners, whereby the second fastening members 120 disposed at the protrusions of the four corners of the third layer are exposed. The second fastening members 120 are fixed and coupled to the four corners of the third layer by sewing or adhesion.

A lower surface of the backrest, which is the first layer, is made of air mesh (functional highly elastic fabric having pores, e.g. synthetic fiber, such as polyester or nylon), whereby elasticity and breathability are excellent.

Meanwhile, the strip-shaped handle 300 is coupled to an upper surface of the backrest so as to extend in a longitudinal direction. It is preferable for the handle 300 to be made of fabric having high strength, e.g. synthetic fiber, such as poly nylon; however, the present invention is not limited thereto, and the handle may be made of leather or a synthetic resin. The handle 300 has a strip shape configured such that the width of a front side and a rear side thereof is greater than the width of a middle part thereof. The front end and the rear end of the handle 300 are fixed to the upper surface of the backrest by sewing such that the handle is held in a horizontal direction of the handle or such that the safety belt passes through the lower surface of the handle and the upper surface of the backrest. The front end and the rear end of the handle fixed to the backrest by sewing have relatively large widths, whereby the handle is not easily separated and stably fixed to the backrest when external shock is applied.

An upper surface of the handle is coated with luminous paint, whereby night visibility of the harness is improved. A non-slip portion 310 coated with a material having excellent friction, such as silicone, is formed at each of the lower surface and the upper surface of the handle. It is preferable for the non-slip portion 310 to be constituted by an array of a plurality of regularly-arranged silicone coating spots; however, the present invention is not limited thereto. The non-slip portion is formed at the lower surface as well as the upper surface of the handle, whereby slippage is prevented when a person holds the handle. In addition, when the safety belt 500 of the vehicle passes through the inside of the handle 300 and is fastened thereto, as shown in FIGS. 12 and 13, the safety belt 500 abuts the lower surface of the handle. Consequently, the safety belt stably abuts the handle without slippage by the non-slip portion, whereby the animal wearing the harness may be protected in a situation, such as collision, while having a predetermined degree of freedom.

In the embodiment of the present invention, the backrest 100 has a quadrangular shape having convexly protruding corners; however, the present invention is not limited thereto, and the construction of the backrest is not particularly restricted as long as the second fastening members fastened to the four first fastening members of the chest rest and the handle are provided. In addition, various changes in design are possible.

The backrest 100 has four second fastening members 120 corresponding to the first fastening members 220. The first and second fastening members are separably coupled to each other. One or more of the first fastening members are fastened to corresponding ones of the second fastening members in the state in which the breast and a part of the abdomen of the companion dog are wrapped by the chest rest and the backrest is disposed from the back neck to the back, whereby the harness is worn on the animal.

The handle is disposed on the fourth layer so as to extend longitudinally from the front to the rear thereof, and the front end and the rear end of the handle are coupled to the fourth layer by sewing in the state in which the width of each of the front end and the rear end of the handle is greater than the width of the middle part of the handle.

When a person controls the animal wearing the harness while holding the handle of the backrest or when external shock is applied in the state in which the safety belt 500 inserted between the backrest of the harness and the hand at the time of boarding a vehicle, the shock is transmitted to the three-dimensional pattern unit via the support portion 121 and the main body cover 211 through the bands 221, and is finally transmitted to the body of the animal that abuts the three-dimensional pattern unit. When great shock is applied, the three-dimensional pattern unit is brought into tight contact with a weak body portion of the animal to absorb the shock, as described above.

In accordance with an aspect of the present invention, shock or load applied to a companion dog is uniformly distributed to a harness when the harness is worn, whereby the shock or the load is minimized.

In accordance with another aspect of the present invention, it is possible to provide a harness for animals capable of securing safety of a person and a companion dog in a vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A harness for animals, the harness comprising a chest rest configured to wrap a chest or the chest and a part of an abdomen of an animal, wherein
the chest rest comprises:
a main body portion comprising a front area, a rear and a middle area extending from the front area to the rear area, the middle area being long and narrow; and
a plurality of bands coupled to the main body portion, each of the bands being provided at one end thereof with a first fastening member configured to perform fastening when the harness is worn,
a three-dimensional pattern is formed in left-right symmetry at an inner surface of the chest rest that abuts a body of the animal when the chest rest is worn,
the three-dimensional pattern comprises:
a first cushion portion formed at the front area,
a central axis portion formed to extend along the central axis of the main body portion at a rear of the first cushion portion,
one or more pairs of second cushion portions disposed in left-right symmetry on opposite sides of the central axis portion in the middle area, and
a pair of third cushion portions formed in left-right symmetry on both sides of the central axis portion in the rear area, and
an outer edge area is formed at outer circumferences of the first to third cushion portions a thickness of the outer edge area is less than a thickness of each of the first to third cushion portions, and a thickness of the central axis portion is equal to or less than the thickness of the outer edge area.

2. The harness according to claim 1, wherein
the three-dimensional pattern comprises high-density sponge.

3. The harness according to claim 1, wherein
a plurality of cushion portions comprising the first, second and third cushion portions are formed at the inner surface of the chest rest so as to have the three-dimensional pattern, the plurality of cushion portions having greater thicknesses than the central axis portion and the outer edge area,
a thin area between the plurality of cushion portions is bent such that the chest rest is three-dimensionally brought into tight contact with a body shape of the animal when the harness is worn, and
the first cushion portion is disposed at the front area abuts a breast of the animal when the harness is worn.

4. The harness according to claim 2, wherein
a concave step portion is formed at a rear middle of the first cushion portion,
the central axis portion extends from the step portion along the central axis of the main body portion is formed and one or more pairs of second cushion portions are disposed in left-right symmetry in a state in which the central axis portion is interposed therebetween from the step portion,
a pair of front wing portions is formed in left-right symmetry at opposite sides of the front area of the main body portion, and
a pair of rear wing portions is formed in left-right symmetry at opposite sides of the rear area of the main body portion.

5. The harness according to claim 1, wherein
the chest rest comprises a main body cover configured to support the chest rest and a three-dimensional pattern unit coupled to the main body cover,
the three-dimensional pattern unit constituted by the three-dimensional pattern is formed by compressing high-density sponge,
a first cushion portion is formed at a front area of the three-dimensional pattern unit, one or more pairs of second cushion portions are formed in left-right symmetry at opposite sides of a middle area of the three-dimensional pattern unit based on a central axis of the main body portion, and a pair of third cushion portions is formed in left-right symmetry at opposite sides of a rear area of the three-dimensional pattern unit based on the central axis of the main body portion.

6. The harness according to claim 1, wherein
the chest rest is configured by coupling a plurality of layers of fabric,
a strip-shaped support portion extending along a central axis of the chest rest is coupled to a lower surface of the main body cover located at a middle layer of the plurality of layers of fabric,
the bands are coupled to a front part and a rear part of the support portion,
an elastic member is interposed between each band and the support portion, the band being connected to the support portion via the elastic member,
the elastic member is disposed such that opposite ends of the elastic member protrude from a left and a right of the support portion, the elastic member being coupled to the support portion, and
the band abuts one surface of each of the protruding opposite ends of the elastic member, whereby double folded portions are formed symmetrically, one or more of the double folded portions being coupled to the one surface of the elastic member.

7. The harness according to claim 1, further comprising:
a backrest configured to be worn on a back area at a rear of a back neck of the animal, the backrest having second fastening members corresponding to the first fastening member, wherein
the chest rest and the backrest are separably coupled to each other via the first and second fastening members,
a handle is coupled to an upper surface of the backrest, and
the handle has a long strip shape extending from a front to a rear thereof, a front end and a rear end of the handle being attached to the upper surface of the backrest so as to be held at left and right sides.

8. The harness according to claim 7, wherein non-slip coatings are formed on upper and lower surfaces of the handle as patterns.

9. A harness for animals, the harness comprising:
a chest rest configured to wrap a chest of an animal; and
a backrest having a handle coupled thereto, wherein
the chest rest and the backrest are separably coupled to each other via a band and a fastening member,
a three-dimensional pattern is formed at an inner surface of the chest rest which brought contact with the chest of the animal when the chest rest is worn, and
the three-dimensional pattern is formed in left-right symmetry and a plurality of cushion portions is formed in left-right symmetry,
the three-dimensional pattern unit comprises a main body portion comprising a front area. a rear area and a middle area extending from the front area to the rear area,
the three-dimensional pattern comprises:
a first cushion portion formed at the front area,
a central axis portion formed to extend along a central axis of the main body portion at a rear of the first cushion portion,
one or more pairs of second cushion portions disposed in left-right symmetry on opposite sides of the central axis portion in the middle area, and
a pair of third cushion portions formed in left-right symmetry on both sides of the central axis portion in the rear area, and
an outer edge area is formed at outer circumferences of the first to third cushion portions. a thickness of the outer edge area is less than a thickness of each of the first to third cushion portions, and a thickness of the central axis portion is equal to or less than the thickness of the outer edge area.

10. A three-dimensional pattern unit for chest rests of a harness for animals, the three-dimensional pattern unit being disposed at an inner surface of a chest rest so as to abut a body of an animal when the harness is worn, wherein the three-dimensional pattern unit is formed by compressing high-density sponge so as to have different thicknesses depending on area thereof such that a three-dimensional pattern is formed in left-right symmetry, the three-dimensional pattern unit comprises a main body portion comprising a front area, a rear area and a middle area extending from the front area to the rear area, the middle area being long and narrow, two front wing portions formed in left-right symmetry at opposite sides of the front area of the main body portion, and two rear wing portions formed in left-right symmetry at opposite sides of the rear area of the main body portion, the three-dimensional pattern comprises:

a first cushion portion formed at the front area, a central axis portion formed to extend along a central axis of the main body portion at a rear of the first cushion portion, one or more pairs of second cushion portions disposed in left-right symmetry on opposite sides of the central axis portion in the middle area, and a pair of third cushion portions formed in left-right symmetry on both sides of the central axis portion in the rear area, and an outer edge area is formed at outer circumferences of the first to third cushion portions. a thickness of the outer edge area is less than a thickness of each of the first to third cushion portions, and a thickness of the central axis portion is equal to or less than the thickness of the outer edge area.

11. The three-dimensional pattern unit according to claim 10, wherein a plurality of cushion portions comprising the first, second and third cushion portions are formed at one surface of the three-dimensional pattern unit in left-right symmetry based on the central axis of the main body portion, and the plurality of cushion portions are disposed spaced apart from each other, an area between the plurality of cushion portions is bent such that the chest rest is three-dimensionally brought into tight contact with a body shape of the animal when the harness is worn, and the plurality of cushion portions has greater thicknesses than peripheries of the cushion portions.

* * * * *